(12) United States Patent  
Brewer et al.

(10) Patent No.: US 7,517,820 B2  
(45) Date of Patent: Apr. 14, 2009

(54) POLYMERS FOR WATER-PERMEABLE PROTECTIVE MATERIALS

(75) Inventors: Stuart Anson Brewer, Salisbury (GB); Corinne Amy Stone, Salisbury (GB); Colin Robert Willis, Salisbury (GB); Brian Alan Beadle, Hull. (GB)

(73) Assignee: The Secretary of State for Defence in Her Britannic Majesty's Government of the United Kingdom of Great Britain and Northern Ireland, Salisbury, Wiltshire (GB)

( * ) Notice: Subject to any disclaimer, the term of this patent is extended or adjusted under 35 U.S.C. 154(b) by 61 days.

(21) Appl. No.: 10/479,665

(22) PCT Filed: Jan. 17, 2003

(86) PCT No.: PCT/GB03/00271

§ 371 (c)(1),  
(2), (4) Date: Apr. 21, 2004

(87) PCT Pub. No.: WO03/062321

PCT Pub. Date: Jul. 31, 2003

(65) Prior Publication Data

US 2004/0166350 A1    Aug. 26, 2004

(30) Foreign Application Priority Data

Jan. 17, 2002    (GB) ................... 0200957.9

(51) Int. Cl.  
*B32B 27/04*    (2006.01)

(52) U.S. Cl. .................. 442/121; 442/122; 442/59

(58) Field of Classification Search .............. 442/121, 442/122

See application file for complete search history.

(56) References Cited

U.S. PATENT DOCUMENTS

| 3,249,572 | A |   | 5/1966 | Davis et al. |
|---|---|---|---|---|
| 4,214,039 | A | * | 7/1980 | Steiner et al. ............... 428/414 |
| 4,719,147 | A |   | 1/1988 | Mauri |
| 5,391,426 | A |   | 2/1995 | Wu |
| 5,753,008 | A | * | 5/1998 | Friesen et al. .................. 95/45 |
| 5,858,554 | A |   | 1/1999 | Neal et al. |
| 6,099,621 | A |   | 8/2000 | Ho |
| 6,214,932 | B1 |  | 4/2001 | Maslanka |
| 6,551,950 | B1 | * | 4/2003 | Badyal et al. ................. 442/79 |
| 2003/0118814 | A1 | * | 6/2003 | Workman et al. .......... 428/365 |

FOREIGN PATENT DOCUMENTS

WO    WO 98/34982    8/1998

OTHER PUBLICATIONS

Abstract of Japanese Patent Document No. 10025389, Jan. 27, 1998.  
Abstract of Japanese Patent Document No. 6228347, Aug. 16, 1994.  
Abstract of Japanese Patent Document No. 6055702, Mar. 1, 1994.

* cited by examiner

*Primary Examiner*—Arti Singh  
(74) *Attorney, Agent, or Firm*—Kilpatrick Stockton LLP (57) ABSTRACT

The invention provides use of a polymer composition comprising polyethylenimine and one or both of polyvinyl alcohol and polyvinyl alcohol co-ethylene for protection against harmful and/or noxious agents. The invention further provides a laminate suitable for providing protection against harmful and/or noxious agents, the laminate comprising a layer of a polymer composition comprising polyethylenimine and one or both of polyvinyl alcohol and polyvinyl alcohol co-ethylene is also disclosed.

33 Claims, 4 Drawing Sheets

POLYMERS FOR WATER-PERMEABLE PROTECTIVE MATERIALS

CROSS REFERENCE TO RELATED APPLICATIONS

This application is the U.S. national phase of International Application No. PCT/GB03/00271 filed on Jan. 17, 2003 and published in English as International Publication No. WO 03/062321 A1 on Jul. 31, 2003, which application claims priority to Great Britain Application No. 0200957.9 filed on Jan. 17, 2002, the contents of which are incorporated by reference herein.

The present invention relates to novel uses of polymer compositions comprising polyethylenimine and one or both of polyvinyl alcohol and polyvinyl alcohol co-ethylene, and the incorporation of these polymer compositions into laminate materials.

Polyvinyl alcohol (PVOH) is a versatile, water-soluble polymer that may be used as an adhesion promoter in the food packaging industry. Polyethylenimine (PEI), often referred to as polyethyleneimine, is a water-soluble, cationic polymer that is commonly used in ion exchange columns to remove anions from solution.

Protective fabrics and clothing are widely used by emergency services and armed forces world-wide to provide protection against harmful agents. The harmful agents are typically organic compounds and may vary from bulk chemicals held in large containers to chemical or biological warfare agents. Such protective fabric and clothing is typically heavy, bulky and has a low water vapour permeability. Clothing used to protect wearers against exposure to chemical and biological warfare agents in particular suffers from these problems. The clothing is generally made from some sort of rubber or neoprene, with the result that the clothing is very heavy, very thick, stiff and has poor water vapour permeability. This can cause severe physical and psychological problems for the wearer.

It has surprisingly been found that polymer compositions of polyethylenimine and one or both of polyvinyl alcohol and polyvinyl alcohol co-ethylene overcome some or all of these problems.

In accordance with the present invention, use of a polymer composition comprising polyethylene and one or both of polyvinyl alcohol and polyvinyl alcohol co-ethylene for protection against harmful and/or noxious agents. This polymer composition provides an unexpectedly good barrier against harmful agents, such as gaseous and liquid chemical warfare agents. The polymer composition preferably provides a substantial permeability to water vapour, preferably at least 400 g/m$^2$/day, more preferably at least 600 g/m$^2$/day and most preferably at least 800 g/m$^2$/day. It is further preferred that the polymer composition is in the form of a layer. This allows the polymer composition to be readily applied to many surfaces to give protection against harmful agents. The layer may have a thickness of between 1 and 1000 μm. The required thickness will depend on the precise mode of use of the polymer composition. For application on to a fabric substrate, it has been found that it may be desirable for the layer thickness to be between 10 and 100 μm, preferably 20 and 60 μm. This gives good protection, without making the fabric too heavy or stiff. For other applications it may be desirable for the layer to have a thickness of at least 20 μm. The polymer composition may be used in a fabric and/or item of clothing, preferably as a layer, thus providing a fabric and/or an item of clothing that is permeable to water vapour but with a low permeability to harmful agents.

The polymer composition may further comprise a crosslinking agent, such as a dibasic acid. This allows the solubility of the polymer composition to be altered as seen fit by the person skilled in the art.

The polymer composition preferably further comprises water; water reduces stiffness and increases the flexibility of any material incorporating the polymer composition. Furthermore, it is a cheap and non-toxic solvent with which to prepare the polymer composition.

The total mass of the polyethylenimine, polyvinyl alcohol and polyvinyl alcohol co-ethylene may comprise between 30% and 95%, and preferably between 60% and 95% of the mass of the polymer composition. Such polymer contents give good protection against harmful and/or noxious agents.

Protection is preferably provided against organic agents. Such protection is useful for those dealing with spills of organic agents, such as diesel and petrol.

Protection may be provided against harmful agents in the gaseous and/or liquid states.

Protection is also preferably provided against chemical warfare agents and/or biological warfare agents. Such protection is unexpectedly achieved using polymer compositions of polyethylenimine and polyvinyl alcohol.

The polymer composition may be in the form of a sacrificial coating. A sacrificial coating is one that may be readily removed from the surface on which the coating is formed. Alternatively, the sacrificial coating may be a coating wherein a portion of an exposed surface of the coating may be readily removed to yield more of the sacrificial coating beneath. Thus, a coating (or potion thereof) contaminated with a harmful agent may be readily removed.

In a second embodiment of the invention, there is provided a laminate suitable for providing protection harmful and/or noxious agents, the laminate comprising a layer of a polymer composition comprising polyethylenimine and one or both of polyvinyl alcohol and polyvinyl alcohol co-ethylene. The laminate is preferably substantially permeable to water vapour, preferably having a water vapour permeability of at least 400 g/m$^2$/day, more preferably at least 600 g/m$^2$/day and most preferably at least 800 g/m$^2$/day. The layer of the polymer composition provides an unexpectedly high resistance to harmful agents, such as chemical warfare agents.

The layer may have a thickness of between 1 and 1000 μm. The required thickness will depend on the precise mode of use of the polymer composition. For application on to a fabric substrate, it has been found that it may be desirable for the layer thickness to be between 10 and 100 μm, preferably 20 and 60 μm. This gives good protection, without making the fabric too heavy or stiff.

For other applications it may be desirable for the layer to have a thickness of at least 20 μm. The polymer composition maybe used in a fabric and/or item of clothing, preferably as a layer, thus providing a fabric and/or an item of clothing that is permeable to water vapour but with a low permeability to harmful and/or noxious agents.

The polymer composition may further comprise a crosslinking agent, such as a dibasic acid. This allows the solubility of the polymer composition to be altered as seen fit by the person skilled in the art.

The polymer composition preferably further comprises water; water reduces stiffness and increases the flexibility of any material incorporating the polymer composition. Furthermore, it is a cheap and non-toxic solvent with which to prepare the polymer composition.

The total mass of the polyethylenimine, polyvinyl alcohol and polyvinyl alcohol co-ethylene may comprises between 30% and 95%, and preferably between 60% and 95% of the mass of the polymer composition. Such polymer contents give good protection against noxious agents.

Protection is preferably provided against organic agents. Such protection is useful for those dealing with spills of organic agents, such as diesel and petrol.

Protection may be provided against harmful agents in the gaseous and/or liquid states.

Protection is also preferably provided against chemical warfare agents and/or biological warfare agents. Such protection is unexpectedly achieved using polymer compositions of polyethylenimine and polyvinyl alcohol.

The polymer composition may be in the form of a sacrificial coating. A sacrificial coat is one that may be readily removed from the surface on which the coating is formed. Alternatively, the sacrificial coating may be a coating wherein a portion of an exposed surface of the coating may be readily removed to yield more of the sacrificial coating beneath. Thus, a coating (or portion thereof) contaminated with a harmful agent may be readily removed.

As an alternative to a sacrificial coating, the layer of the polymer composition may be interposed between two other layers. This allows the polymer composition to be protected by other layers. Furthermore, such a laminate takes advantage of the fact that the polymer composition acts as an adhesive. At least one of the two other layers may be hydrophilic; this enables the hydrophilic polymer composition to adhere to the other layer. At least one of the other two layers may be a fabric.

The present invention will now be described by way of example only with reference to the following figures of which.

EXAMPLE 1

Manufacture of Polymer Compositions Comprising Polyethylenimine and Polyvinyl Alcohol Table 1 shows the composition of polymer compositions A-S. PVOH refers to polyvinyl alcohol, PEI refers to polyethylenimine and HMW/LMW refers to whether the polymers used were of high or low molecular weight respectively. HMW indicates that both of the polymers used were of high molecular weight, whereas LMW indicates that both of the polymers used were of low molecular weight. PVOH and PEI were supplied by Aldrich, Dorset, UK. PVOH was 99+% hydrolysed, the low molecular weight polymer having Mw of 89,000-98,000, the high molecular weight polymer having Mw of 124,000-186,000. PEI was supplied water-free, the low molecular weight polymer having Mw of 800 and the high molecular weight polymer having Mw of 25,000.

In the case of compositions A-R, each composition was prepared by mixing aqueous solutions of PVOH and PEI. Solutions of PVOH were produced by mixing a known mass of PVOH (one of 5, 10 and 20 g) with 100 ml of distilled water to produce the % w/v solutions that are referred to in Table 1. The mixture was heated to 90° C. using a hot plate, stirring continuously. Further distilled water was added during dissolution to maintain a constant volume of water. The temperature of the water was monitored to ensure 90° C. was not exceeded. Once the PVOH had dissolved the mixture was allowed to cool with further stirring.

TABLE 1 composition of polymer compositions of PEI and PVOH

| Composition | Concentration of PVOH solution prior to mixing (% w/v) | Concentration of PEI solution prior to mixing (% w/v) | Molecular weight of polymers HMW (H) LMW (L) |
|---|---|---|---|
| A | 5 | 10 | H |
| B | 10 | 10 | H |
| C | 5 | 20 | H |
| D | 20 | 10 | H |
| E | 20 | 20 | H |
| F | 10 | 20 | H |
| G | 20 | 20 | L |
| H | 20 | 10 | L |
| I | 10 | 10 | L |
| J | 10 | 5 | L |
| K | 5 | 10 | L |
| L | 5 | 5 | L |
| M | 5 | 5 | H |
| N | 10 | 5 | H |
| O | 20 | 5 | H |
| P | 5 | 20 | L |
| Q | 10 | 20 | L |
| R | 20 | 5 | L |
| S | — | — | H |

A parent aqueous solution of PEI was made by making a 20% w/v solution of PEI in water (e.g. 20 g of PEI dissolved in 100 ml of water). Lower concentration solutions of PEI were then made by diluting samples of the parent solution. Table 1 shows the % w/v of the PEI solutions prior to mixing with PVOH solution. The PVOH and PEI solutions as described were then mixed in a 1:1 weight ratio in order to produce compositions A-R of Table 1. The compositions were shaken or stirred to aid mixing, then left to stand to reduce the number of bubbles present. Composition S was made by mixing equal volumes of water, PVOH pellets and PEI.

The reader should recognise that the % w/v figures in Table 1 are concentration figures with reference to the relevant initial starting solutions of PVOH and PEI. Mixing of the two solutions causes a halving of the actual PEI or PVOH concentration in the mixed solution when compared to the starting solutions.

The compositions A-S may be readily dehydrated to produce polymer compositions of differing water content.

EXAMPLE 2

Manufacture of Sheets Comprising Polymer Compositions of Polyethylenimine and Polyvinyl Alcohol The compositions A-S can be dehydrated to form more viscous compositions. In each case, the parent composition (one of A-S) was slowly poured onto a glass plate and allowed to spread. The thus formed thin liquid layer was allowed to dry to form a film of a more viscous composition. A structurally sound, flexible film may be peeled from the glass support after about 16 hours of drying. The thickness of the film will depend on many factors, such as the initial thickness of the thin liquid layer, which in turn depends on, inter alia, the viscosity of the initial composition and rate of pouring. Typical thicknesses of about 0.1-0.5 mm were achieved. Thin films of sub-0.1 mm thickness may be formed using a spread coater.

Efforts were made to determine the water content of cast films. Equal volumes of 30% w/vol. polyethylenimine in water and 30% w/vol. polyvinyl alcohol were mixed. A film was cast from this solution by spreading the solution onto a glass plate using a spreading knife. The mass of the cast film was measured as a function of time as the film was allowed to dry at room temperature at ambient relative humidity levels. After some hours the mass of the film stabilised at about 40% of the original mass, indicating that the mass ratio of polymer to water was about 30:10. This was confirmed when the film was heated in a dry oven to 100° C. The mass of the oven-dried film was about 30% of the original film weight, indicating all of the water had been removed.

Those skilled in the art will realise that sheets cast from the polymer solutions mentioned above can be dried in ambient conditions or in an oven.

EXAMPLE 3

Testing of Permeability of Sheets Formed in Example 2

Figure 1:
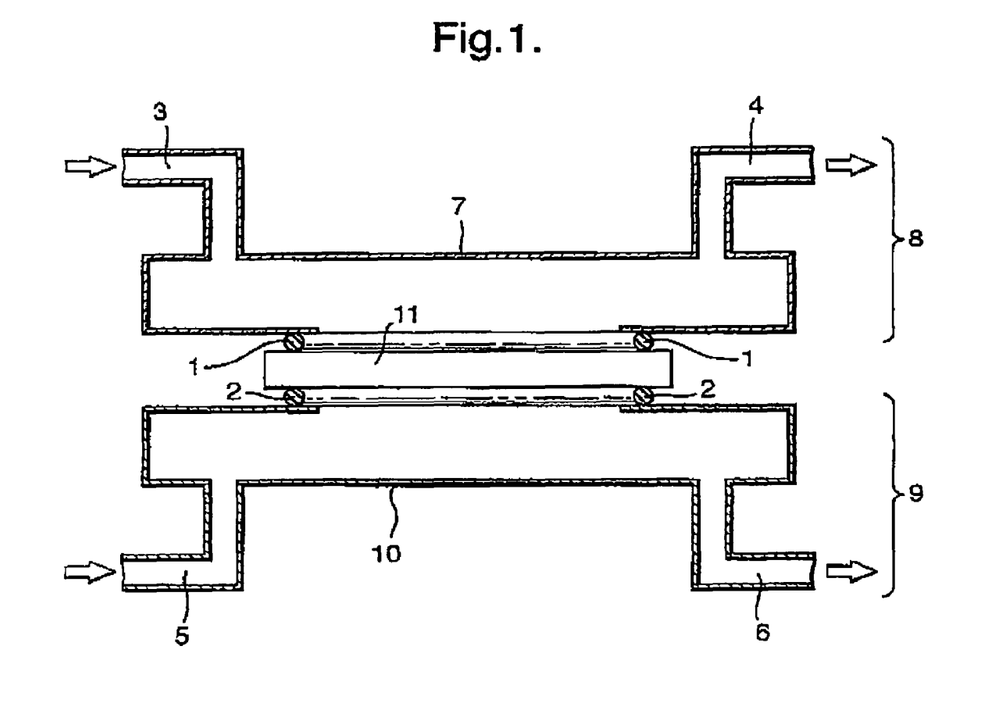
FIG. 1 is a schematic cross-sectional representation of a membrane test cell used to measure the permeability of, inter alia, sheets comprising polymer compositions of polyethylenimine and polyvinyl alcohol.

The permeability of the sheets formed in Example 2 to various gaseous agents was tested using the membrane test cell shown schematically in cross-section in FIG. 1. A sample 11, not being part of the membrane test cell is shown in place for testing. The membrane test cell comprises two halves 8 and 9, half 8 comprising a challenge inlet 3 in gaseous communication with a sample test body 7 and a challenge outlet 4, whereas half 9 comprises a test gas inlet 5 in gaseous communication with a sample test body 10 and a test gas outlet 6, and wherein, in use, a sample 11 is brought between the two halves 8, 9, with an O-ring 1, 2 placed between the sample 11 and one half 8, 9 to ensure a gas tight seal between the sample 11 and the O-rings 1, 2 so that air may not pass directly from one half 8, 9 to the other without passing through the sample 11. In use, a challenge gas is passed into the challenge inlet 3, into the sample test body 7 and out of the membrane test cell via challenge outlet 4. The sample test body 7 is shaped so that the sample is subjected to the challenge gas while the challenge gas is maintained within the membrane test cell. If the sample 11 is permeable to any component of the challenge gas, then the permeable component will pass through the sample 11 to half 9. The test gas is passed through the test gas inlet 5 to the sample test body 10 and out of the membrane test cell via test gas outlet 6. The sample test body 10 is shaped so that the sample is subjected to the test gas while the test gas is maintained within the membrane test cell. The test gas is transferred to suitable analytical equipment (not shown) to be analysed. Any component of the challenge gas that permeates through the sample 11 into half 9 is transported by the test gas out of the membrane test cell to the analytical equipment which is designed to detect presence of the challenge gas or components thereof in the test gas.

The permeabilities of several sheets formed in accordance with Example 2 were measured with respect to several challenges. The gaseous challenge was flowed over one side of the sample 11 at a rate of about 1 liter/min. The test gas was clean air that was flowed over the other side of the sample 11 at a rate of about 150 ml/min. The test gas was then fed into a quadrupole mass spectrometer (not shown) for analysis of the test gas. The challenges were ammonia hexane, chloropicrin ($C(Cl_3)(NO_2)$) (hereinafter "PS"), cyanogen chloride ($C(Cl)N$)) (hereinafter "CK") and iodomethane (hereinafter "MeI"). In each case, the challenge is stored in a lamofoil bag which is attached to the challenge inlet 3 of the membrane test cell. Details of the preparation of the challenges are given below.

Hexane

A lamofoil bag containing a challenge concentration of 4000 mg/m$^3$ was produced by passing 80% relative humidity (RH) air over a known mass of hexane at a known rate for a period of time sufficient to ensure complete evaporation of hexane. The hexane penetrating the sample 11 was detected by tuning the mass spectrometer to ion mass 57 ($C_4H_9^+$ fragment).

Ammonia

Ammonia challenge mixtures were produced by passing cylinder ammonia into a lamofoil bag at a rate of 5 liter/min. for 4 minutes. The ammonia penetrating the sample 11 was detected by tuning the mass spectrometer to ion mass 17.

Cyanogen Chloride (CK)

Cyanogen chloride challenge mixtures of 8000 mg$^3$ in air were produced by injecting 290 cm$^3$ of cyanogen chloride into a lamofoil bag containing 80 liters of 80% RH air. The mixture was blended thoroughly. The cyanogen chloride penetrating the sample 11 was detected by tuning the mass spectrometer to ion mass 61.

Chloropicrin (PS)

A lamofoil bag containing a challenge concentration of 8000 g/m$^3$ in air was produce by passing 0% RH air over a known mass of chloropicrin at a known rate for a period of time sufficient to ensure complete evaporation of the chloropicrin. The chloropicrin penetrating the sample 11 was detected by timing the mass spectrometer to ion mass 117.

Iodomethane (MeI)

A lamofoil bag containing a challenge concentration of 48000 mg/m$^3$ in air was produced by passing 80% RH air over a known mass of iodomethane at a known rate for a period of time sufficient to ensure complete evaporation of the iodomethane. The iodomethane penetrating the sample 11 was detected by tuning the mass spectrometer to ion mass 142.

Table 2 gives details at to whether various sheets of material formed in accordance with Example 2 were permeable to the various challenge gases.

TABLE 2 penetration of various agents through sheets of polymer composition of polyethylenimine and polyvinyl alcohol

| Sample | CK | Hexane | PS | Ammonia | MeI |
| --- | --- | --- | --- | --- | --- |
| H | — | — | N | N | — |
| J | N | N | N | N | — |
| M | N | N | N | N | — |
| O | — | — | — | — | N |
| P | N | N | N | N | — |
| PDMS | Y | Y | Y | Y | — |
| PE | — | Y | — | — | Y |

"N" indicates that no breakthrough of the challenge was observed,
"Y" indicates that breakthrough of the challenge was observed and
"—" indicates that the sample was not tested.
PDMS was 0.1-0.25 mm thick polydimethylsiloxane (Goodfellows);
PE was 10 μm thick polyethylene.

The sample letter indicates the parent solution of the polymer composition from which the sheet of material was manufactured using the methodology of Example 2.

These data indicate that sheets of material made from polymer compositions of polyethylenimine and polyvinyl alcohol are, surprisingly, substantially impermeable to the gaseous challenges used, including two chemical warfare agents (PS and CK). It was found that the sheets are also substantially impermeable to dichloromethane.

The permeability of several sheets as made in accordance with Example 2 to water vapour was investigated using the membrane test cell of FIG. 1. The challenge, humid air, was created by passing dry air through a water bubbler. The test gas was dry air. The air pressure of the challenge was slightly greater than the test air. The test air was passed from the test gas outlet 6 into a relative humidity sensor (not shown). The relative humidity of the test gas was indicative of the amount of water vapour that had passed through the sample 11. The rates of flow of air through both the challenge and two halves of the cell 8, 9 were monitored using airflow meters.

Figure 2:
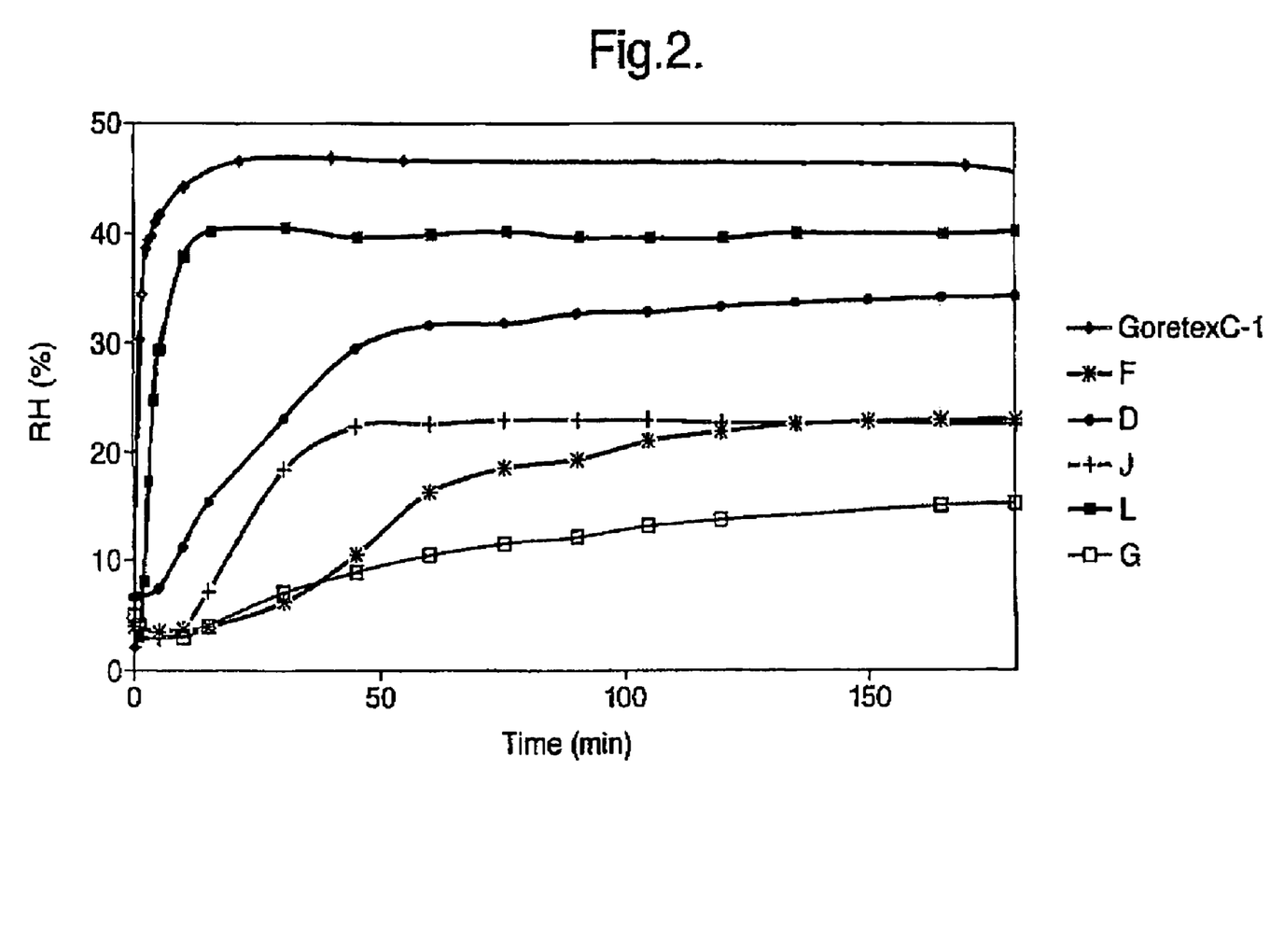
FIG. 2 is a graphical representation of water vapour penetration versus time as measured by the membrane test cell of FIG. 1 through a series of sheets comprising polymer compositions of polyethylenimine and polyvinyl alcohol.

FIG. 2 shows the measured relative humidity (RH) of test air passed across the surface of sheets of polymer material in accordance with Example 2 as a function of time when the sheet is challenged with humid air. The relative humidity of the test air is indicative of the water vapour permeability of the sheets. It can be seen that all of the sheets are permeable to water vapour to some degree. This is surprising, given that the sheets of polymer material were substantially impermeable to hexane, ammonia, CK, dichloromethane, MeI and PS. Test data for a sample of GoreTex® fabric are shown for comparison.

EXAMPLE 4

Use of the Sheets of Example 2 as Sacrificial Coatings

Experiments with the sheets of Example 2 have indicated that polymer compositions of polyethylenimine and polyvinyl alcohol may be used to make sacrificial coatings. A sacrificial coating is one that may be readily removed from the surface on which the coating is formed. Alternatively, the sacrificial coating may be a coating wherein a portion of an exposed surface of the coating may be readily removed to yield more of the sacrificial coating beneath. A sheet cast from polymer composition G was marked using a permanent marker pen. The ink was allowed to dry for between about 30 secs. and 1 minute. The same permanent marker pen was used to mark a glass surface (a Pyrex® glass beaker) and the ink allowed to dry for between about 30 secs. and 1 minute. The glass surface acted as a control.

The ink was washed from the polymer sheet using room temperature water dispensed from a wash-bottle without rubbing or otherwise abrading the surface. After the application of water the surface of the sheet felt different to the surrounding unwetted coating, being slightly tacky. This indicates that the sheet had been affected by the water. It appears that the sheet is either dissolving to some degree or being swollen by the water.

The ink could only be partially removed from the glass surface using room temperature water and hand-pressure rubbing.

These data indicate that polymer compositions of polyethylenimine and polyvinyl alcohol may be used as sacrificial coatings. For example, such a coating may be applied to surface that are susceptible to the unwanted application of marking materials such as spray paint. Furthermore, such a coating may be used to protect a surface from noxious agents such as chemical warfare agents. Washing with water may then remove the noxious agent (and possibly the coating) from the surface to be protected.

EXAMPLE 5

The Resistance to Liquid Chemical Warfare Agents of Laminate Materials Comprising Polymer Compositions of Polyethylenimine and Polyvinyl Alcohol Polymer compositions of polyethylenimine and polyvinyl alcohol may be incorporated into a laminate material to provide the laminate material with the beneficial properties of the polymer compositions. 25 ml of high molecular weight PVOH was dissolved in water with heating to 90° C. 12 g of high molecular weight PEI was added with stirring and the mixture was set aside to cool. A small amount (about 2 g) of the resulting viscous solution was then spread between two layers of moisture vapour permeable membrane and a heavy roller was used to produce a thin laminate. The sample was set aside to dry for about 24 hours. The moisture vapour permeable membrane was a fabric, about 0.2 mm thick, comprising expanded PTFE, with a sample size of about 20 cm×20 cm.

The laminate material was then subjected to sulphur mustard (HD) and soman (GD) challenges. The sample was mounted in a test cell and 5×2 µl drops (10 µl total) of either HD or GD were applied to the surface. A Petri dish was used to cover the test cell so that no HD or GD vapour was lost to the ambient atmosphere. The vapour penetrating the test sample was subsequently measured using gas chromatography analysis. The permeability results are summarised in Table 3.

TABLE 3 permeability of laminate comprising a polymer composition of polyethylenimine and polyvinyl alcohol

| Challenge | Vapour penetrating laminate in 24 hours (µg) |
|---|---|
| HD | 1.48 |
| HD | 1.71 |
| GD | 0.92 |
| GD | 0.47 |
| Control (exposed to 10 µl of HD) | 229.4 |

Control - two layers of the vapour permeable membrane only

The results of table 3 indicate that a layer of a polymer composition of polyethylenimine and polyvinyl alcohol can greatly decease the permeability of a laminate to noxious chemicals such as mustard and soman vapour.

EXAMPLE 6

Prolonged Exposure of Sheets Comprising a Polymer Composition of Polyethylenimine and Polyvinyl Alcohol to Challenge by Liquid Chemical Warfare Agents Polymer sheets were prepared using the general methodology of Example 2. A sheet was loaded into a permeability test cell. One side of the sample was contaminated with 1 µl of either HD or GD. A glass lid was placed over the challenge to prevent evaporation. Any of the chemical passing through the sheet was collected on an automatic desorption tube and subsequently analysed by gas chromatography. Table 4a provides a summary of permeability data obtained from these experiments.

TABLE 4a penetration of sheets comprising a polymer composition of polyethylenimine and polyvinyl alcohol by GD and HD

| Composition of parent solution | Agent | Cumulative Agent vapour penetration (µg) at given time | | | | | | | |
|---|---|---|---|---|---|---|---|---|---|
| | | 1 hr | 2 hr | 3 hr | 4 hr | 6 hr | 8 hr | 23 hr | 24 hr |
| Equal amounts of high molecular weight PEI and PVOH | GD | 0.016 | 0.023 | 0.028 | 0.034 | 0.038 | 0.044 | 0.061 | 0.061 |
| | GD | 0.1 | 0.13 | 0.15 | 0.17 | 0.19 | 0.21 | 0.29 | 0.29 |
| | HD | 0.001 | 0.002 | 0.002 | 0.002 | 0.002 | 0.004 | 0.013 | 0.013 |
| | HD | 0.002 | 0.003 | 0.005 | 0.006 | 0.009 | 0.01 | 0.018 | 0.018 |

Several more sheets were spread from the solutions of Example 2 using a spreading knife. The films were lifted from the glass substrate and examined in accordance with the methodology of this Example 6 above. The data yielded by the knife-spread films are presented in Table 4b.

TABLE 4b penetration of sheets comprising a polymer composition of polyethylenimine and polyvinyl alcohol by GD and HD

| Composition of parent solution | Agent | Cumulative Agent vapour penetration (µg) at given time | | | | | | | |
|---|---|---|---|---|---|---|---|---|---|
| | | 1 hr | 2 hr | 3 hr | 4 hr | 6 hr | 8 hr | 23 hr | 24 hr |
| B | HD | 0.00 | 0.00 | — | 0.00 | 0.003 | — | 0.089 | 0.0895 |
| | GD | 0.00 | 0.00 | — | 0.0135 | 0.0285 | — | 0.1045 | 0.105 |
| D | HD | 0.00 | 0.00 | — | 0.00 | 0.00 | — | 0.026 | 0.0265 |
| | GD | 0.037 | 0.066 | — | 0.13 | 0.19 | — | 0.71 | 0.75 |

Referring to Example 2, B and D indicate the solutions from which the sheets were cast.

Tables 4a and 4b indicates that sheets of polymer composition comprising polyethylenimine and polyvinyl alcohol are relatively impermeable to HD and GD when subjected to a prolonged challenge.

EXAMPLE 7

The Resistance to Chemical Warfare Agents of Laminate Materials Comprising Polymer Compositions of PEI and PVOH The ability of polymer compositions comprising PEI and polyvinyl alcohol to form coatings on fabrics was investigated. Parent solution B (see Example 2) was coated onto one of two fabrics, Goretex® and UK standard army camouflage material, using a spreading knife. The coated fabric was then inserted into an oven at 100 degrees centigrade, 40% relative humidity in order to cure the polymer coating. Goretex® was coated on its hydrophilic side, whereas either side of camouflage material could be coated with equal success. Multiple layer of polymer coating could be applied by repeating the spreading-curing cycle multiple times.

Figure 3A:
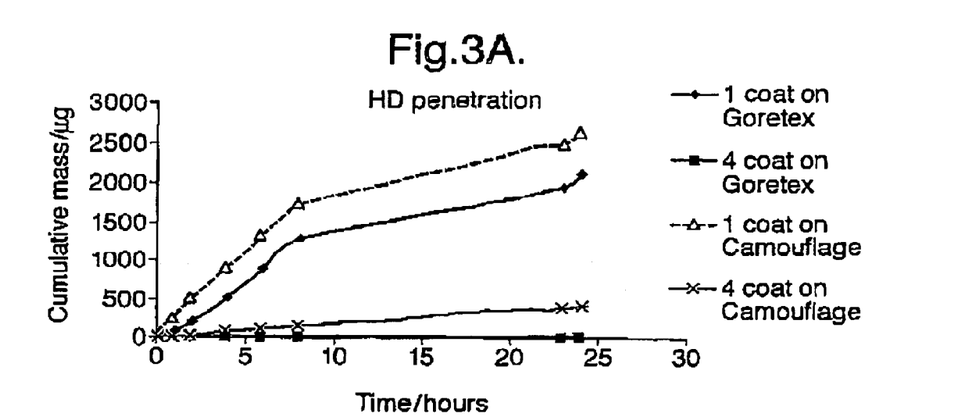
FIGS. 3a and 3b show the permeability of fabrics coated with polymer compositions of polyethylenimine and polyvinyl alcohol to sulphur mustard (HD) and soman (GD) chemical warfare agents.
Figure 3B:
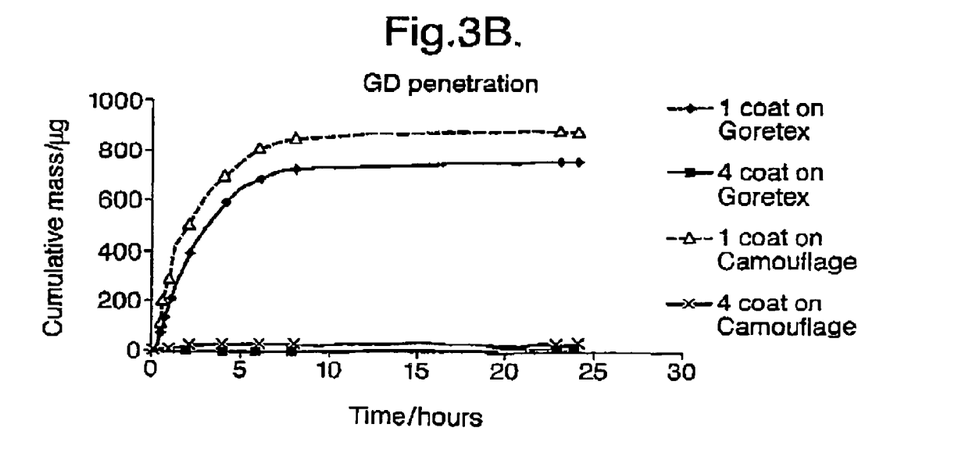

The resistance to HD and GD chemical warfare agents of Goretex® and camouflage material coated with 1 or 4 layers of polymer was examined, the results being given in FIGS. 3a and 3b.

FIGS. 3a and 3b illustrate that the permeability of the coated fabrics to the challenge agents was low. Furthermore, the application of a thicker coating provides greater protection against the challenges used. Such effects are unexpected, given the relatively thin coatings provided to the fabrics; the thickness of the 1 layer polymer coating was about 20 µm, whereas the 4 layer polymer coating was about 60 µm thick.

Figure 4A:
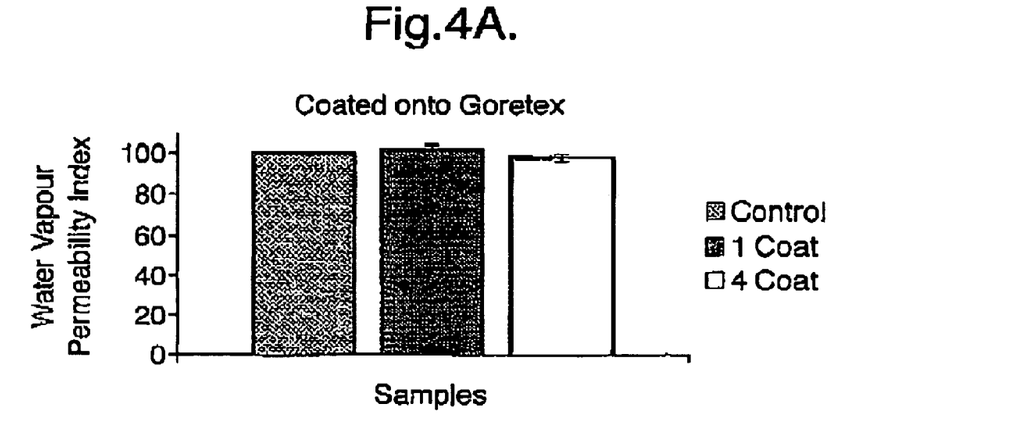
FIGS. 4a and 4b show the relative water vapour permeability of Goretex® and camouflage fabrics coated with polymer compositions of polyethylenimine and polyvinyl alcohol.
Figure 4B:
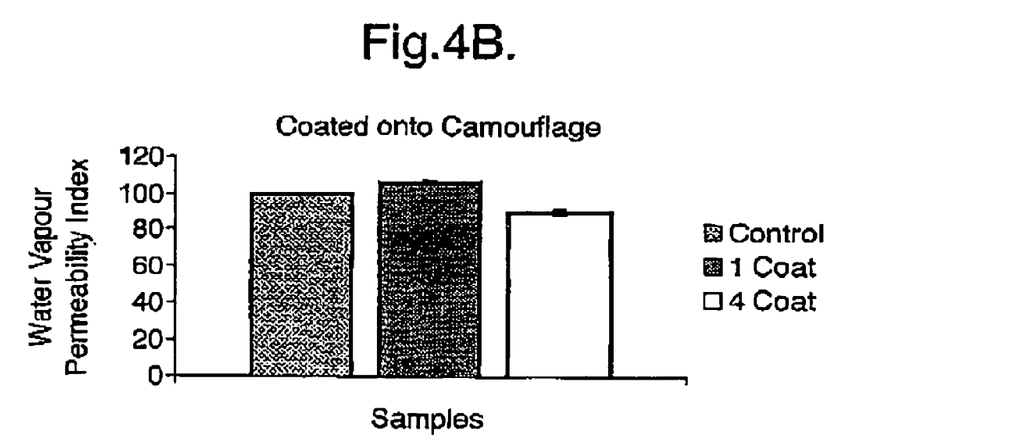

The water vapour permeabilities of the coated fabrics were determined using the general methodology given below. A known volume of water is transferred from a burette into an open dish. A test sample is then placed over the open mouth of the dish and secured in place by adhesive to ensure that there are no air gaps between the test sample and the rim of the dish. An annular cover ring is then placed over the test sample and dish. The cover ring is secured in place by adhesive tape, sealing the join between the cover ring and dish, thus forming a sample assembly. The sample assembly is then placed on a turntable in a test chamber. The turntable then rotates the sample assembly for a period of not less than an hour in order to establish equilibrium of the water vapour gradient. At the end of this equilibrium period the mass of the sample assembly is determine to with 0.001 g. The sample assembly is returned to the table and rotated for a known period of not less than five hours. The mass of the sample assembly is then determined, the difference between the initial and final mass measurements being the amount of water lost from the sample assembly over the known time period. The water vapour permeability of the sample can then be readily determined. Using this technique, it was determined that the sample coated with 1 layer of polymer had an average water vapour permeability of 800 g/m²/day, whereas the sample coated with 4 layers of polymer had an average water vapour permeability of 650 g/m²/day. A water vapour permeability index can then be calculated from the water vapour permeable data, the water vapour permeability index being the ratio of the water vapour permeability of the coated sample to the water vapour permeability of the uncoated sample, multiplied by 100. The conditions within the test chamber were well controlled with relative humidity of 65±2% and temperature of 20±2° C. It should be noted that many sample assemblies may be mounted on the turntable and tested at the same time. FIGS. 4a and 4b show that the water vapour permeability indices of the coated fabrics are little different from those of the uncoated fabrics. This is very surprising, given that the coated fabrics provide significant protection against many harmful agents, such as chemical warfare agents.

EXAMPLE 8

Fire Retardant Properties of Polymer Compositions of Polyethylenimine and Polyvinyl Alcohol It has been found that relatively thick sheets (e.g. more than about 2 mm thick) made from polymer compositions of polyethylenimine and polyvinyl alcohol, for example using the general methodology of Example 2, are very difficult to ignite using a naked flame such as a match. Thus, polymer compositions of polyethylenimine and one or both of polyvinyl alcohol and polyvinyl alcohol co-ethylene may be of use in fire retardant materials. It should be noted that thin sheets (typically of about 0.1-0.5 mm thickness) can burn. It is likely that the fire retardant properties of the polymer compositions are related to their water content. Thick sheets may have a higher water content than thin sheets and are thus less likely to burn or ignite.

It should be noted that polymer compositions of polyethylenimine and polyvinyl alcohol are advantageous in that they may be prepared using water as a solvent, thus obviating the need for organic solvents that may be expensive to purchase and to dispose of.

The invention claimed is:

1. A water vapor permeable protective material comprising a polymer composition in the form of a layer comprising
    a) polyethylenimine, and
    b) polyvinyl alcohol, polyvinyl alcohol co-ethylene or a combination thereof,
    wherein the total mass of the polyethylenimine, polyvinyl alcohol and polyvinyl alcohol co-ethylene comprises between 30% and 95% of the mass of the polymer composition, and wherein the layer has low permeability to harmful or noxious agents and is substantially permeable to water vapor.

2. The water vapor permeable protective material of claim 1 wherein the layer has a thickness of between 1 and 1000 µm.

3. The water vapor permeable protective material of claim 2 wherein the layer has a thickness of between 10 and 100 µm.

4. The water vapor permeable protective material of claim 3 wherein the layer has a thickness of between 20 and 60 µm.

5. The water vapor permeable protective material of claim 1 wherein the layer has a thickness of at least 20 µm.

6. The water vapor permeable protective material of claim 1 wherein the polymer composition further comprises a cross-linking agent.

7. The water vapor permeable protective material of claim 6 wherein the cross-linking agent is a dibasic acid.

8. The water vapor permeable protective material of claim 1 wherein the polymer composition further comprises water.

9. The water vapor permeable protective material of claim 1 wherein the total mass of the polyethylenimine, and polyvinyl alcohol, polyvinyl alcohol co-ethylene, or combination thereof is between 60% and 95% of the mass of the polymer composition.

10. The water vapor permeable protective material of claim 1 wherein the harmful or noxious agents are organic agents.

11. The water vapor permeable protective material of claim 1 wherein the harmful or noxious agents are in a gaseous state, a liquid state or a combination thereof.

12. The water vapor permeable protective material of claim 1 wherein the harmful or noxious agents are chemical warfare agents, biological warfare agents or a combination thereof.

13. The water vapor permeable protective material of claim 1 wherein the layer is in the form of a sacrificial coating.

14. The water vapor permeable protective material of claim 1 wherein the water vapor permeability of the layer is at least 400 $g/m^2/day$.

15. The water vapor permeable protective material of claim 1, wherein the ratio of permeability of water vapor to noxious agents in the layer is at least about 9.36 million to one.

16. A protective laminate comprising at least one of the layers of claim 1.

17. The laminate of claim 16 wherein the layer has a thickness of between 1 and 1000 µm.

18. The laminate of claim 17 wherein the layer has a thickness of between 10 and 100 µm.

19. The laminate of claim 18 wherein the layer has a thickness of between 20 and 60 µm.

20. The laminate of claim 16 wherein the layer has a thickness of at least 20 µm.

21. The laminate of claim 16 wherein the polymer composition further comprises a cross-linking agent.

22. The laminate of claim 21 wherein the cross-linking agent is a dibasic acid.

23. The laminate of claim 16 wherein the polymer composition further comprises water.

24. The laminate of claim 23 wherein the total mass of the polyethylenimine, and polyvinyl alcohol, polyvinyl alcohol co-ethylene, or combination thereof is between 60% and 95% of the mass of the polymer composition.

25. The laminate of claim 16 wherein the harmful or noxious agents are organic agents.

26. The laminate of claim 16 wherein the harmful or noxious agents are in a gaseous state, a liquid state or a combination thereof.

27. The laminate of claim 16 wherein the harmful or noxious agents are chemical warfare agents, biological warfare agents or a combination thereof.

28. The laminate of claim 16 wherein the polymer composition is in the form of a sacrificial coating.

29. The laminate of claim 16 further comprising an outer layer, wherein the layer of the polymer composition is below and protected by the outer layer.

30. The laminate of claim 29 further comprising a hydrophilic layer to which the polymer composition layer adheres.

31. The laminate of claim 29 wherein at least one of the coating or hydrophilic layers is a fabric.

32. A protective fabric comprising a fabric substrate having a surface to which is laminated at least one layer of the polymer composition of claim 1.

33. A protective item of clothing comprising a fabric substrate having a surface to which is laminated at least one layer of the polymer composition of claim 1.

* * * * *

UNITED STATES PATENT AND TRADEMARK OFFICE
CERTIFICATE OF CORRECTION

PATENT NO. : 7,517,820 B2  Page 1 of 1
APPLICATION NO. : 10/479665
DATED : April 14, 2009
INVENTOR(S) : Stuart Anson Brewer et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 61 days.

should read (*) Notice: Subject to any disclaimer, the term of this patent is extended or adjusted under 35 U.S.C. 154(b) by 180 days.

Signed and Sealed this

Fourth Day of May, 2010

David J. Kappos
*Director of the United States Patent and Trademark Office*